United States Patent [19]

Hutchin

[11] 4,436,417

[45] Mar. 13, 1984

[54] BEAM DIRECTOR FOR OPTICAL RANGING SYSTEM

[75] Inventor: Richard A. Hutchin, Marlboro, Mass.

[73] Assignee: Itek Corporation, Lexington, Mass.

[21] Appl. No.: 368,335

[22] Filed: Apr. 14, 1982

[51] Int. Cl.³ .................................................. G01G 9/02
[52] U.S. Cl. ...................................... 356/4.5; 356/358
[58] Field of Search ................ 356/45, 345, 357, 358, 356/363

[56] References Cited

FOREIGN PATENT DOCUMENTS 53-132372 11/1978 Japan ...................................... 356/5

OTHER PUBLICATIONS

Kol'tsov et al., "Interference Instrument for Recording Zero Position", Izmeritel'naya Tekhnika, No. 7, pp. 29–31, Jul. 1976.
Damaschini, "Application D'un Interferometre a Ondes Multiples . . . ", Optics Communications, vol. 20, No. 3, pp. 441–442, Mar. 1977.
Greve et al., "Modulated Laser Surface Surveying System . . . ", Pro. SPIE, vol. 236, pp. 110–112, 1980.

Primary Examiner—William L. Sikes
Assistant Examiner—Matthew W. Koren
Attorney, Agent, or Firm—Homer O. Blair; Robert L. Nathans; Gerald H. Glanzman

[57] ABSTRACT

A beam director for an optical ranging system for measuring relative distance changes between first and second retroreflectors in which a beam of radiation is introduced between the first and second retroreflectors by a steering beam splitter pellicle positioned obliquely therebetween. A portion of the beam is reflected by the pellicle onto the first retroreflector, which reflects it back through the pellicle onto the second retroreflector, which in turn reflects it back onto the pellicle where it interferes with the radiation beam being initially introduced thereon. The pellicle is rotatable about two axes positioned substantially perpendicular to the radiation beam reflected between the first and second retroreflectors and steers the beam to compensate for relative movements of the retroreflectors. The arrangement is such that translation of the pellicle along any of three axes does affect the optical path difference between the retroreflectors.

4 Claims, 2 Drawing Figures

BEAM DIRECTOR FOR OPTICAL RANGING SYSTEM

BACKGROUND OF THE INVENTION

1. Field of the Invention

The present invention relates generally to an optical distance measuring arrangement, and more particularly pertains to an arrangement for interferometrically measuring the distance between two reflectors, at least one of which is movable with respect to the other. The present invention has particular utility in optical interferometric laser ranging systems which provide very precise incremental distance measurements, and are useful, for instance, in precisely measuring or mapping the contour of a precision optical surface such as a mirror.

2. Discussion of the Prior Art

Laser ranging systems are well known in the prior art, and generally involve two retroreflectors, one positioned on each of two points or surfaces, between which a precise distance measurement is desired. A laser beam is then reflected between the two retroreflectors such that any change in distance therebetween results in a change in the length of the optical path traversed by the laser beam between the retroreflectors. This change in optical path length can be precisely measured interferometrically by setting up an interference pattern between the transmitted laser beam and the returned laser beam as each change in the optical path length of one wavelength results in the interference pattern being modulated through one cycle.

U.S. patent application Ser. No. 282,552 for Measuring System With Redundant Arrangement of Measuring Points, by Greenleaf & Watson, commonly assigned herewith, discloses one application of the present invention in an arrangement for measuring the contour of a complex optical surface in which a redundant configuration of laser ranging distance measuring systems is positioned above the surface being measured. Each laser ranging system monitors changes in distance measurements to a point proximate the surface as the measuring point is moved across the surface. The distance measurements are taken from a sufficient number of points on the surface such that a redundant quantity of data is obtained to define both the system geometry and also the position of each measurement point. The data is then transformed by recognized mathematical techniques into the coordinate positions of all the measured points on the surface.

In the aforesaid patent application, the laser ranging distance measuring systems are differential distance measuring systems in the form of Laser Unequal Path Interferometers (LUPIs) arranged in a tetrahedral configuration above the measured surface, although in alternative embodiments the distance measuring systems could be absolute interferometers operating with several different frequencies of light, all of which can implement the teachings of the present invention. In the context of the particular technological field described in that patent application, the development of distance measuring arrangements providing surface measurements as accurately as possible is an essential part of a program to develop a system for accurately surfacing complex optical surfaces such as large aspherics.

SUMMARY OF THE INVENTION

Accordingly, it is a primary object of the present invention to provide a beam steering arrangement for an interferometric distance measuring system which does not optically degrade the inteferometric measurement.

A further object of the subject invention is the provision of a beam steering arrangement of the aforementioned kind which is very simple in construction and in which translation of the steering element along any of three axes does not affect the optical path difference between the reflectors.

Another object of the present invention is a beam steering arrangement as described above which can be implemented by a relatively nonprecise mechanism which avoids attendant requirements for optical precision.

In accordance with the teachings herein, the present invention provides an optical ranging system having first and second reflectors, the distance between which is being measured optically. A beam of radiation is introduced between the first and second reflectors such that it is reflected therebetween. A steering beam splitter is positioned obliquely in the radiation beam between the first and second reflectors, and the beam of radiation is introduced obliquely onto the beam splitter. A portion of the beam is reflected by the beam splitter onto the first reflector, which reflects it back through the beam splitter onto the second reflector, which in turn reflects it back onto the beam splitter where it interferes with the radiation beam being initially introduced onto the beam splitter. The beam splitter is rotatable about at least a first axis positioned substantially perpendicular to the radiation beam reflected between the first and second reflectors and steers the beam between the reflectors to compensate for relative movements therebetween. The arrangement is such that translation of the steering beam splitter along any of three axes does not affect the optical path difference between the reflectors.

In the preferred embodiments herein, the beam splitter is a thin pellicle to minimize cosine errors caused by the radiation beam traversing through the thickness of the pellicle, and the first and second reflectors are preferably retroreflectors. In the preferred embodiments herein the beam splitter is also rotatable about a second axis to aim or direct the beam in two directions.

BRIEF DESCRIPTION OF THE DRAWINGS

The foregoing objects and advantages of the present invention for a beam director for an optical ranging system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
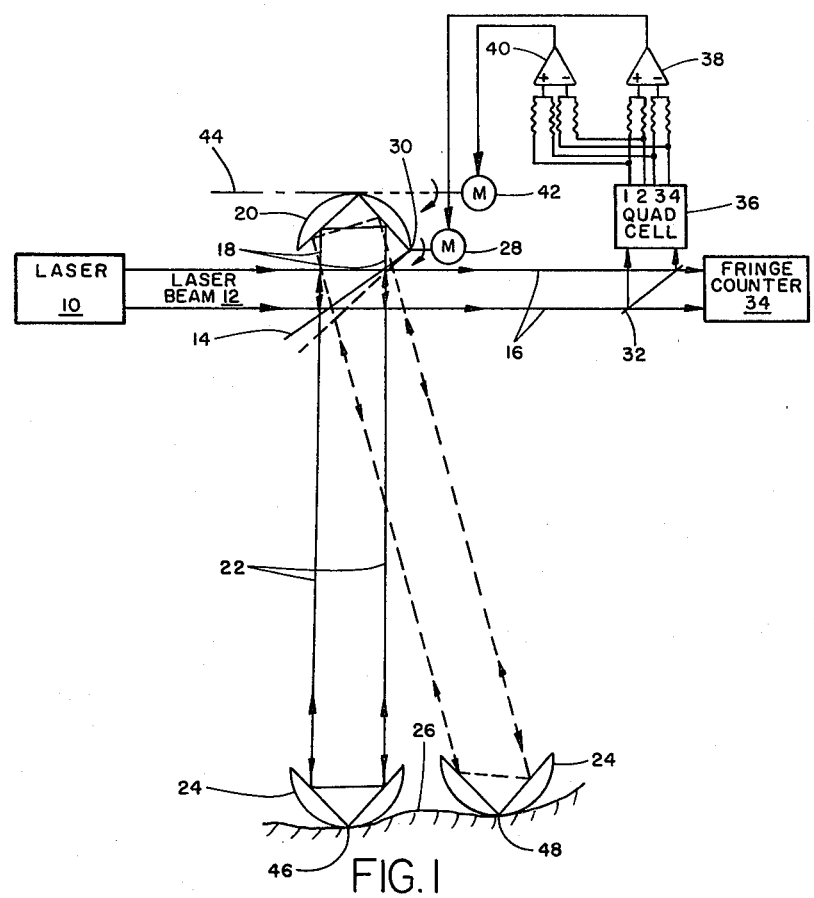
FIG. 1 is a schematic illustration of a first exemplary embodiment of a beam director constructed pursuant to the teachings of the present invention.

Referring to the drawings in detail, FIG. 1 is an optical schematic of a first embodiment of the present invention wherein a laser 10, which can be a commercially available component from sources such as Hewlett Packard, generates a coherent and collimated laser beam 12 which is directed onto a beam director 14 in the form of a beam splitter, preferably a pellicle type of beam splitter pursuant to the teaching of the present invention. A portion 16 of the beam passes through the beam splitter 14, while a second portion of the beam 18 is reflected by the beam splitter 14 to a first reflector 20, which is preferably a retroreflector. Retroreflector 20 redirects the beam through beam splitter 14 along a distance path 22 to a second target reflector 24, which is also preferably a retroreflector movably positioned on a surface 26, the contour of which is being measured. The retroreflectors 20 and 24 are preferably corrected cat's eye or corner cube retroreflectors. The target 24 retroreflects the beam back onto beam splitter 14. This results in an interference pattern thereon formed between the incoming beam 12 and the beam which was reflected by beam splitter 14 between retroreflectors 20 and 24. The interference pattern and the beam returning from target 24 pass to a further beam splitter 32 which allows a first portion thereof to pass through to a fringe counter 34 and reflects a second portion to a quadrant (quad) cell 36 for tracking.

Quad cell 36 may be a commercially available cell having four symmetrically mounted photodetectors in four quadrants (1,2,3,4) which produce four signals of equal amplitude when beam splitter 14 precisely aims the laser beam between retroreflectors 20 and 24. However, if beam splitter 14 does not aim the beam precisely between retroreflectors 20 and 24, the portion of the beam reflected back by retroreflector 24 moves off-center with respect to the laser beam transmitted directly through beam splitter 14, and this results in the amplitudes of the four signals become symmetrically imbalanced in proportion to the aiming error. In this regard, the output signals of appropriate pairs of detectors of quad cell 36 are differentially combined in a differential amplifier 38 to control servo motor 28 in a manner such that rotation of the beam splitter 14 about an axis 30 steers the beam along a direction in the plane of the drawing. Likewise, the output signals of other appropriate pairs of detectors of quad cell 36 are differentially combined in a second differential amplifier 40 to control a second servo control motor 42 to rotate retroreflector 20 about a second axis 44 substantially perpendicular to the first axis 30. This arrangement results in rotation of both the corner cube 20 and pellicle 14 about the axis 44. In this manner, the resultant imbalanced signals are utilized in two feedback servo loops to direct the beam 22 precisely between retroreflectors 20 and 24.

Fringe counter 34 photoelectrically examines the interference pattern to count fringe changes or modulation in a manner known in differential distance measuring interferometry. If retroreflector 24 is stationary relative to retroreflector 20, fringe counter 54 sees a stationary interference pattern and accordingly produces no output counting pulses. However, any relative movement between target retroreflector 24 and retroreflector 20 results in fringes passing by the fringe counter 34, and the number of the count is directly proportional to the magnitude of the movement, in a manner as is known in the interferometry arts. Knowing the wavelength of the laser beam allows a precise calculation of the magnitude of the differential movement, while standard phase displacement techniques allow the direction or sign of the movement to be ascertained.

Accordingly, as target 24 is moved from a first surface measurement point 46 to a second surface measurement point 48, the differential distance measuring interferometer precisely measures the change in the length of path 22, while the quad cell 36 and servocontrols 28 and 42 control the beam to maintain it aimed precisely at the movable retroreflector 24. The position of beam splitter 14 and the optical paths at the second surface measurement point 48 are shown in dashed lines in FIG. 1. Although a two dimensional embodiment of the present invention is illustrated in FIG. 1, a simplified one dimensional embodiment could be utilized to measure the contour of a line in the plane of the drawing, and would utilize beam steering and servo control therefor about only a single axis.

The surface actually described by the center of the retroreflector 24 is positioned above the surface 26 by an amount dependent upon the physical characteristics of the retroreflector, but the actually described surface is parallel to, and mathematically analogous and transformable to the surface 26 being measured.

Beam splitter 14 is preferably a pellicle, which is a beam splitter formed by a very thin (several microns) partially reflecting membrane. A pellicle reduces to a minimum a slight cosine error (approximately 1λ) which is introduced into the optical path length 22 by refraction of the radiation beam traversing through the thickness of the pellicle at different oblique angles thereof. Alternatively, the slight introduced cosine error is a smooth function of the angle and can be readily mathematically determined for different oblique angles of the pellicle and eliminated entirely if so desired.

A major advantage of the beam director of the present invention over prior art approaches using a mirror for steering of the optical measuring beam is that the measuring arrangement is absolutely insensitive to either intentional or inadvertent translational movements of the beam splitter along any of three orthogonal axis, as any such translational movement results in equal and opposite changes in the optical path length on opposite sides of the beam splitter, which accordingly exactly cancel each other out. The same insensitivity to translational movements would not occur if a mirror were utilized for beam steering, as in some prior art approaches to directing a measuring beam in a laser ranging system.

Figure 2:
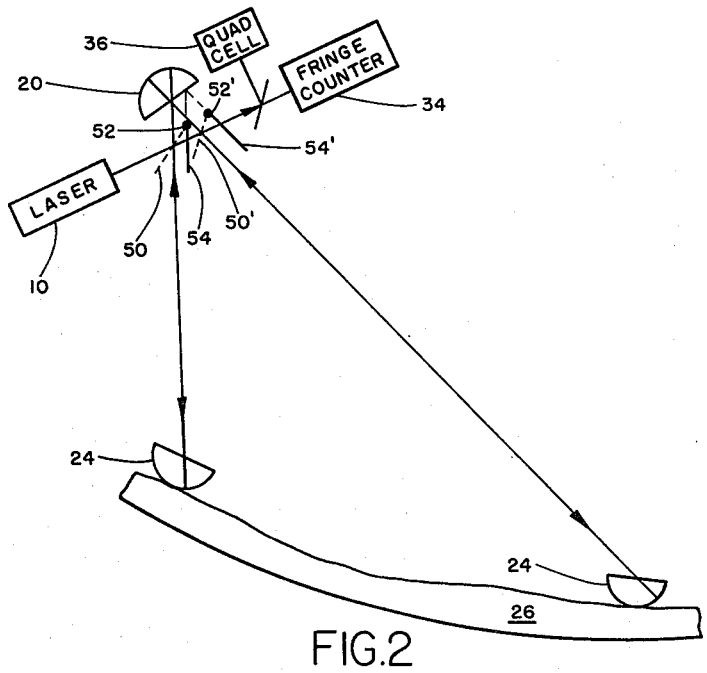
FIG. 2 illustrates a slightly modified second embodiment of the present invention.

This beneficial attribute of the present invention is taken advantage of in the second embodiment illustrated schematically in FIG. 2 which shows one movable pellicle in two different beam steering positions 50 and 50'. In this embodiment the pellicle at position 50 is supported for steering movements about two orthogonally positioned rotational axis 52 and 54, while the corresponding axes at position 50' are shown at 52' and 54'. The differentially combined output signals of quad cell 36 in this embodiment are utilized to drive servo motors to positionally rotate and steer pellicle 50 about axes 50 and 52. The support for the pellicle in this embodiment could be simply a pivotal support mounted at the point of intersection of two lines of extension drawn through the pellicle in the two position 50 and 50'.

While the embodiments disclosed herein have been illustrated in the context of a laser ranging system for determing the shape of an optical surface, the present invention also has direct utility in other types of laser ranging systems, for example in the optical inspection of machined parts. Moreover, although a laser beam is ideally suited for these interferometric measuring systems, other sources of collimated radiation could also be utilized within the context of the teachings of the present invention. Also, although both illustrated embodiments have been described with automatic servo controlled tracking systems, other embodiments, perhaps more rudimentary in nature, might be constructed or implemented with manually controlled tracking systems. In these embodiments the distance between the retroreflectors would normally be measured by steering the radiation beam until the maximum distance therebetween is indicated.

While several embodiments and variations of the present invention for a beam director for an optical ranging system are described in detail herein, it should be apparent that the disclosure and teachings of the present invention will suggest many alternative designs to those skilled in the art.

What is claimed is:

1. An optical ranging system, comprising:
   a. first and second reflectors, the distance between which is being measured optically;
   b. means for introducing a beam of radiation between said first and second reflectors such that the radiation beam is reflected therebetween, including a steering beam splitter positioned obliquely in the radiation beam between the first and second reflectors with the beam of radiation being introduced obliquely onto the beam splitter and a portion of the beam being reflected by the beam splitter onto the first reflector which reflects it back through the beam splitter onto the second reflector which reflects it back onto the beam splitter where it interferes with the radiation beam being initially introduced onto the beam splitter, said beam splitter being rotatable about at least a first axis substantially perpendicular to the radiation beam reflected between the first and second reflectors for steering the beam between the reflectors to compensate for relative movements therebetween, such that translation of the steering beam splitter in any direction does affect the optical path difference between the reflectors.

2. An optical ranging system as claimed in claim 1, said beam splitter being a thin pellicle to minimize cosine errors caused by the radiation beam traversing through the pellicle.

3. A optical ranging system as claimed in claim 2, said beam splitter also being rotatable about a second axis substantially perpendicular to said first axis.

4. A optical ranging system as claimed in claim 2, said first and second reflectors comprising first and second retroreflectors.

* * * * *